(12) United States Patent
Takahashi et al.

(10) Patent No.: US 10,049,373 B2
(45) Date of Patent: Aug. 14, 2018

(54) SYSTEM, METHOD AND COMPUTER PROGRAM FOR ENERGY CONSUMPTION MANAGEMENT

(75) Inventors: Hirotaka Takahashi, Hitachinaka (JP); Yasushi Tomita, Mito (JP); Hideyuki Kawamura, Tokyo (JP); Jumpei Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1184 days.

(21) Appl. No.: 13/982,599

(22) PCT Filed: Mar. 7, 2011

(86) PCT No.: PCT/JP2011/055277
§ 371 (c)(1),
(2), (4) Date: Jul. 30, 2013

(87) PCT Pub. No.: WO2012/120623
PCT Pub. Date: Sep. 13, 2012

(65) Prior Publication Data
US 2013/0311236 A1    Nov. 21, 2013

(51) Int. Cl.
G06Q 10/06 (2012.01)
G06Q 30/02 (2012.01)
G06Q 50/06 (2012.01)

(52) U.S. Cl.
CPC ......... *G06Q 30/0202* (2013.01); *G06Q 10/06* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 5,479,358 A * | 12/1995 | Shimoda | ............ | G05D 23/1902 307/126 |
| 7,206,670 B2 * | 4/2007 | Pimputkar | ................ | H02J 3/14 700/291 |
| 7,711,655 B2 * | 5/2010 | Abe | ........................ | G06Q 10/06 705/400 |
| 8,457,802 B1 * | 6/2013 | Steven | ................... | G06Q 10/00 700/291 |
| 2003/0009265 A1 * | 1/2003 | Edwin | .................... | G06Q 10/06 700/295 |

(Continued)

FOREIGN PATENT DOCUMENTS

| | | | |
|---|---|---|---|
| JP | 2002-176729 A | | 6/2002 |
| JP | 2002-345177 A | | 11/2002 |

(Continued)

*Primary Examiner* — Thomas L Mansfield
(74) *Attorney, Agent, or Firm* — Mattingly & Malur, PC

(57) ABSTRACT

Energy demand in an entire community including multiple demanders is properly predicted and energy consumption thereof is properly controlled. Every day, some demanders are selected from the community and a request to adjust energy consumption for the following day is sent to the selected demanders. To decide a content of the request, energy demand for the following day is predicted. In this case, demanders which did not receive a request on past days are specified, and demand in the community for the following day is predicted based on the actual energy consumption by those demanders on the past days.

11 Claims, 11 Drawing Sheets

(56) References Cited

U.S. PATENT DOCUMENTS

| | | | |
|---|---|---|---|
| 2003/0061091 A1* | 3/2003 | Amaratunga | G06Q 10/06375 705/7.31 |
| 2008/0167931 A1* | 7/2008 | Gerstemeier | G06Q 10/06 705/7.22 |
| 2009/0144568 A1* | 6/2009 | Fung | G06F 1/3203 713/300 |
| 2010/0138363 A1* | 6/2010 | Batterberry | G06Q 10/04 705/412 |
| 2010/0222934 A1 | 9/2010 | Iino et al. | |
| 2011/0238232 A1 | 9/2011 | Tomita et al. | |
| 2012/0095608 A1 | 4/2012 | Murakami et al. | |

FOREIGN PATENT DOCUMENTS

| | | |
|---|---|---|
| JP | 2005-224023 A | 8/2005 |
| JP | 2006-166617 A | 6/2006 |
| JP | 2007-020314 A | 1/2007 |
| JP | 2007-334523 A | 12/2007 |
| JP | 2008-295193 A | 12/2008 |
| JP | 2010-166636 A | 7/2010 |
| JP | 2010-204833 A | 9/2010 |
| JP | 2010-279160 A | 12/2010 |
| JP | 2011-002191 A | 1/2011 |
| JP | 2011-002213 A | 1/2011 |
| JP | 2011-024314 A | 2/2011 |
| JP | 2012-048286 A | 3/2012 |
| JP | 2012-055078 A | 3/2012 |
| JP | 2012-151992 A | 8/2012 |
| JP | 2013-046451 A | 3/2013 |

\* cited by examiner

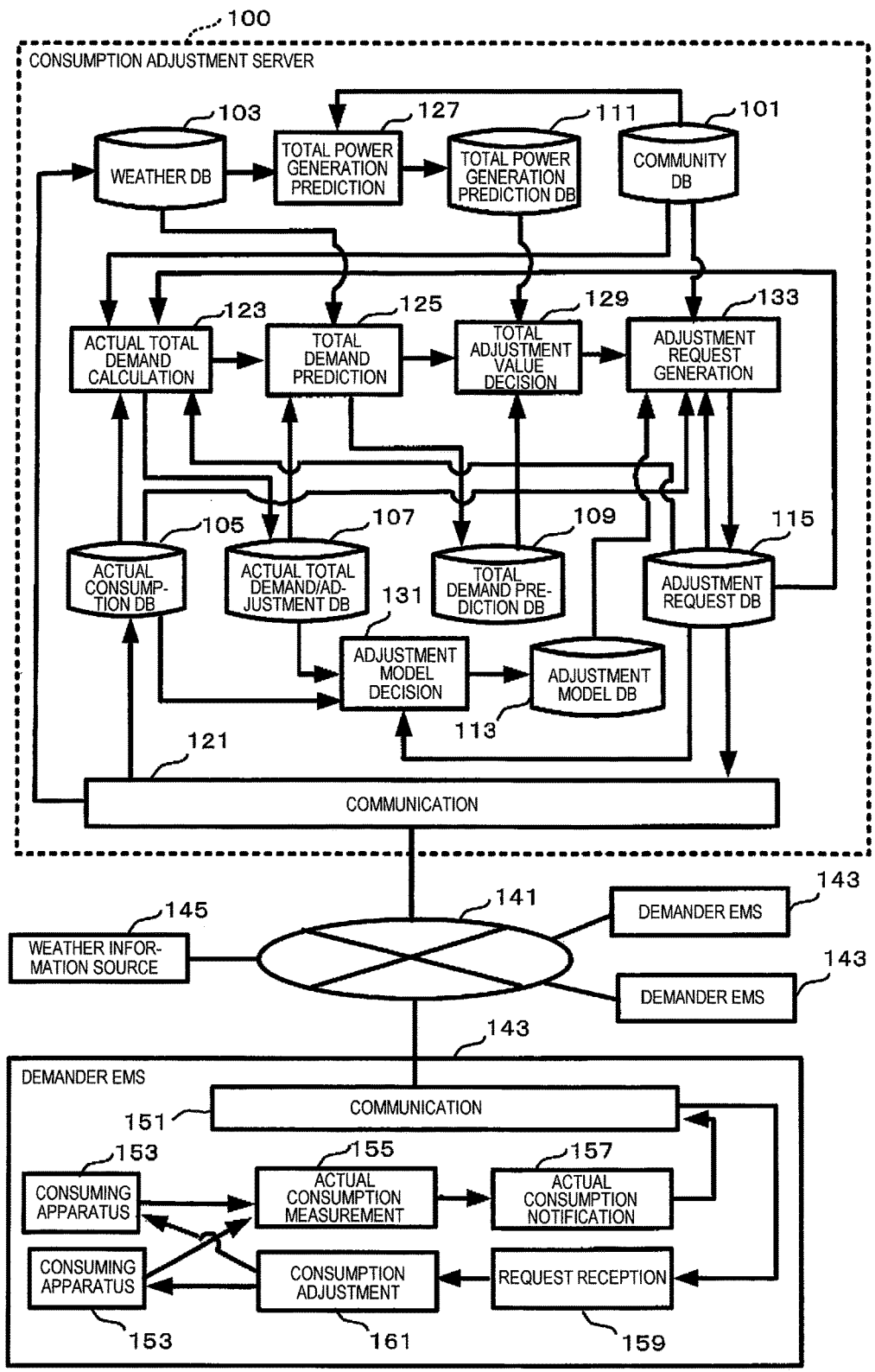
[FIG. 1]

[FIG. 2]
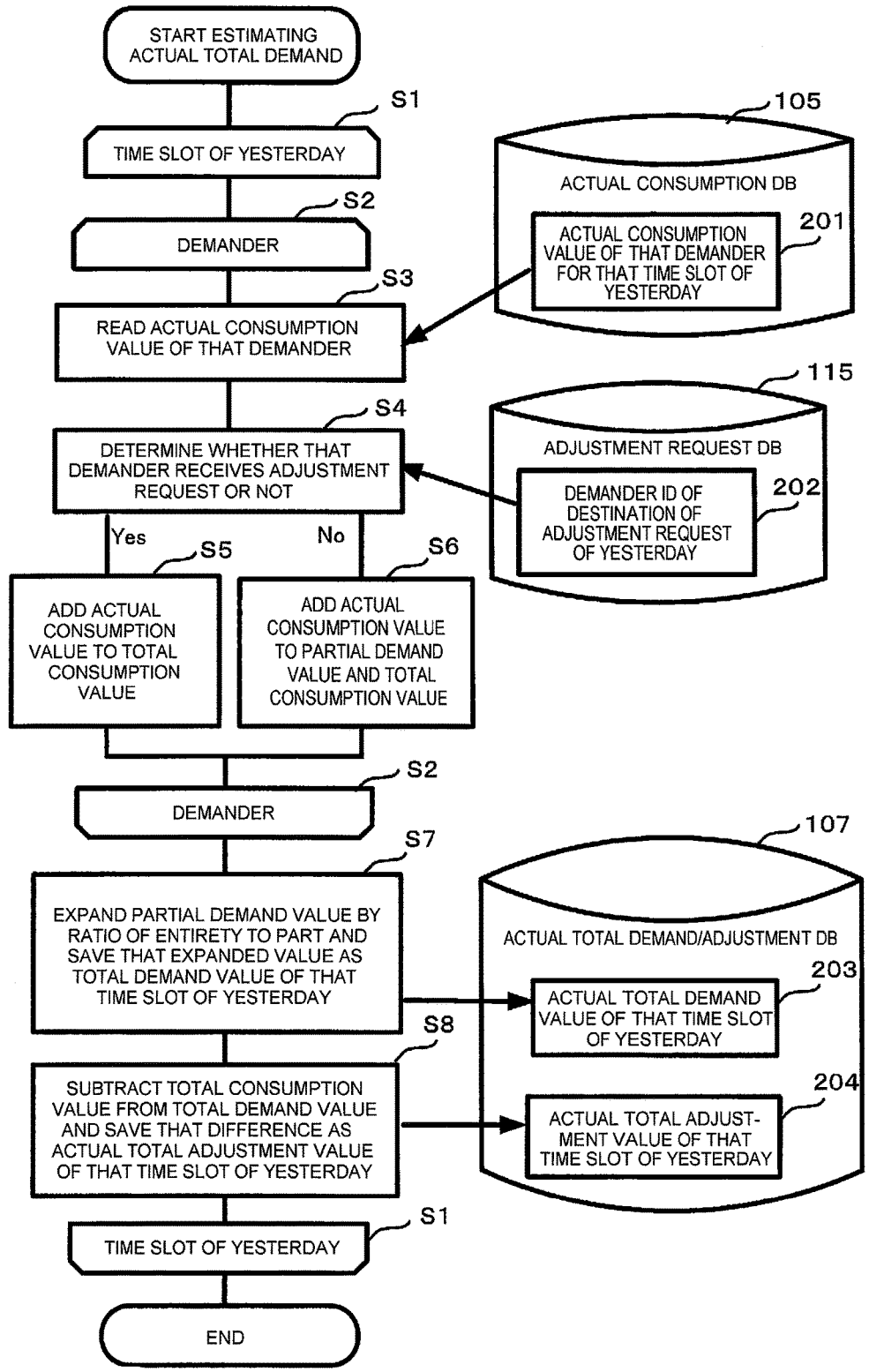

[FIG. 3]
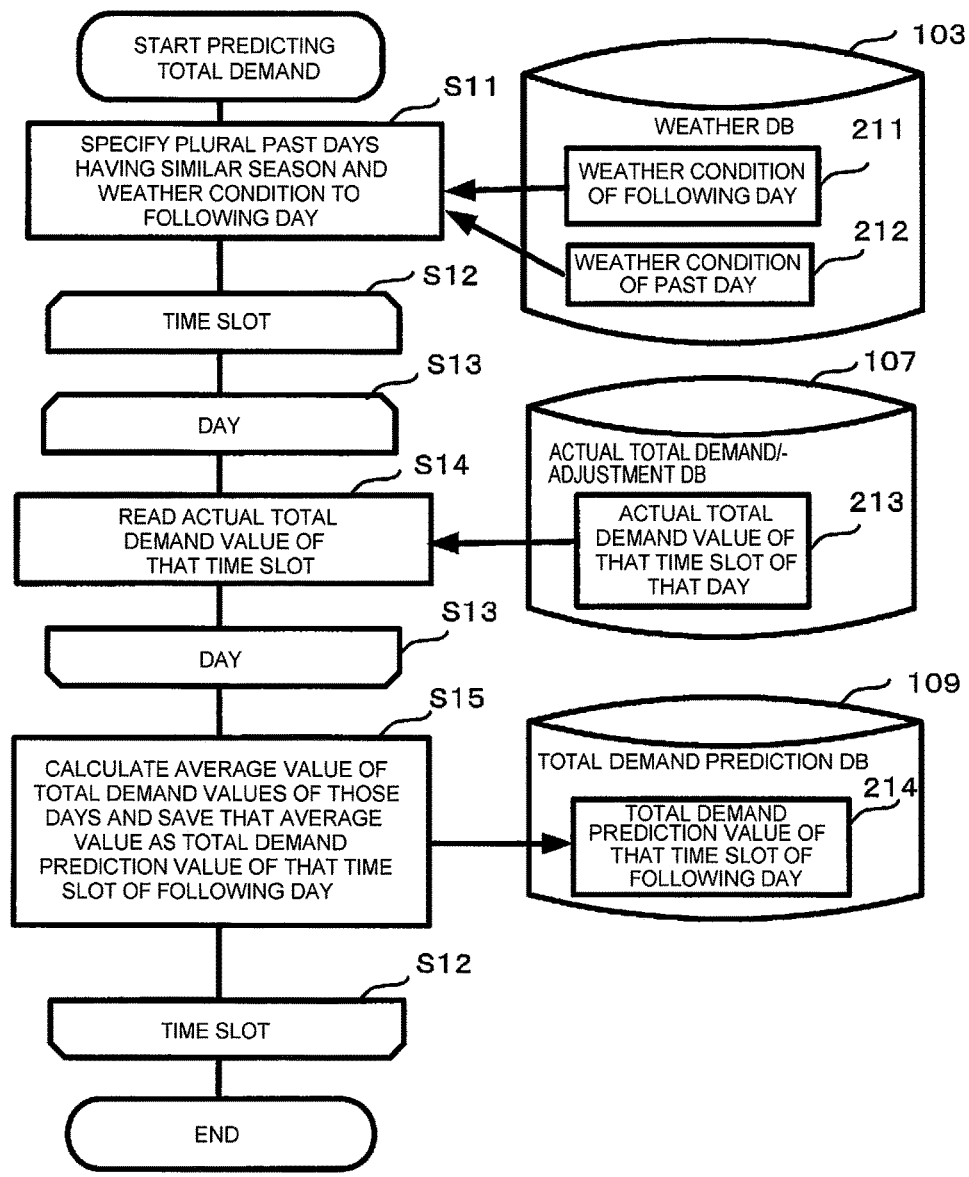

[FIG. 4]
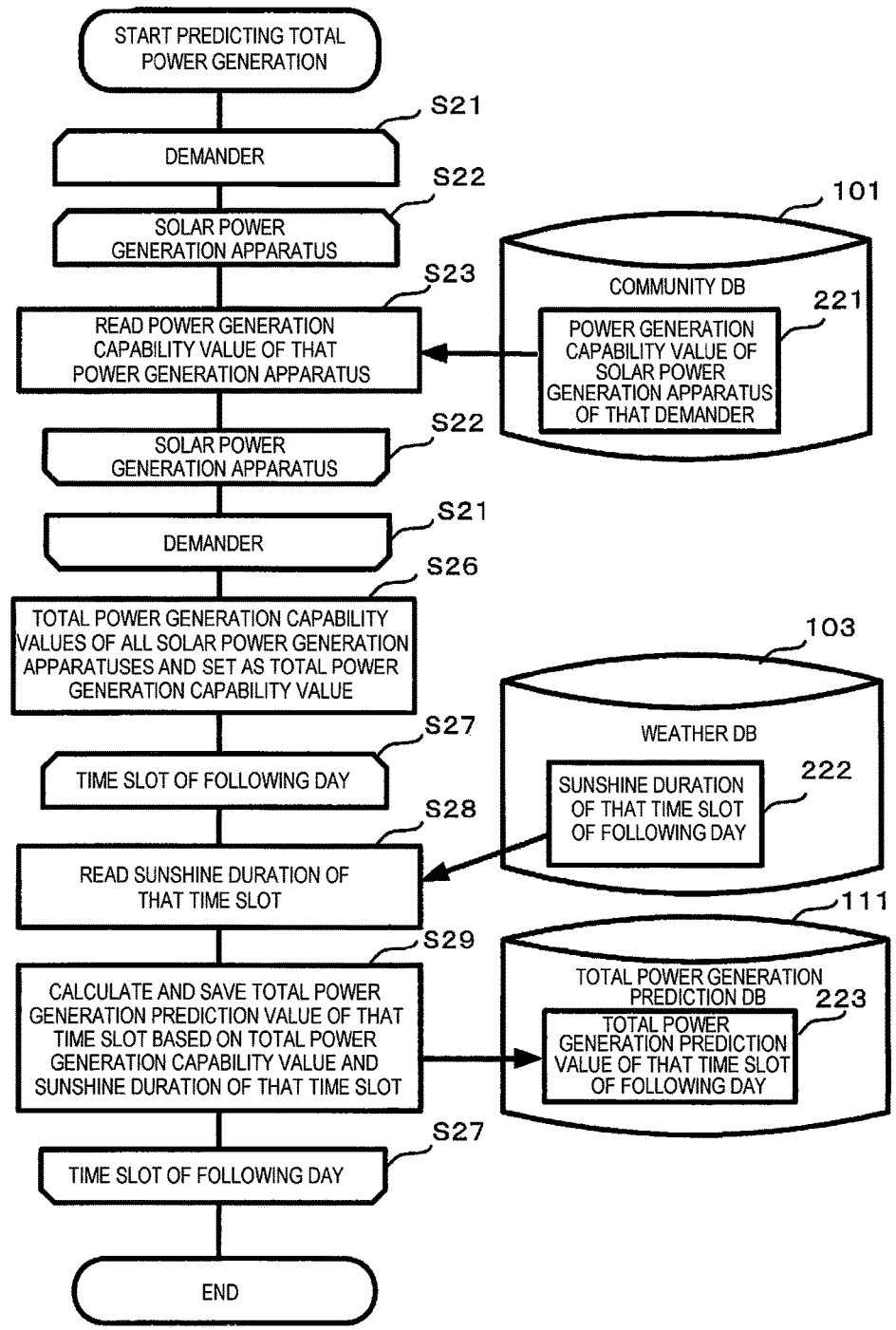

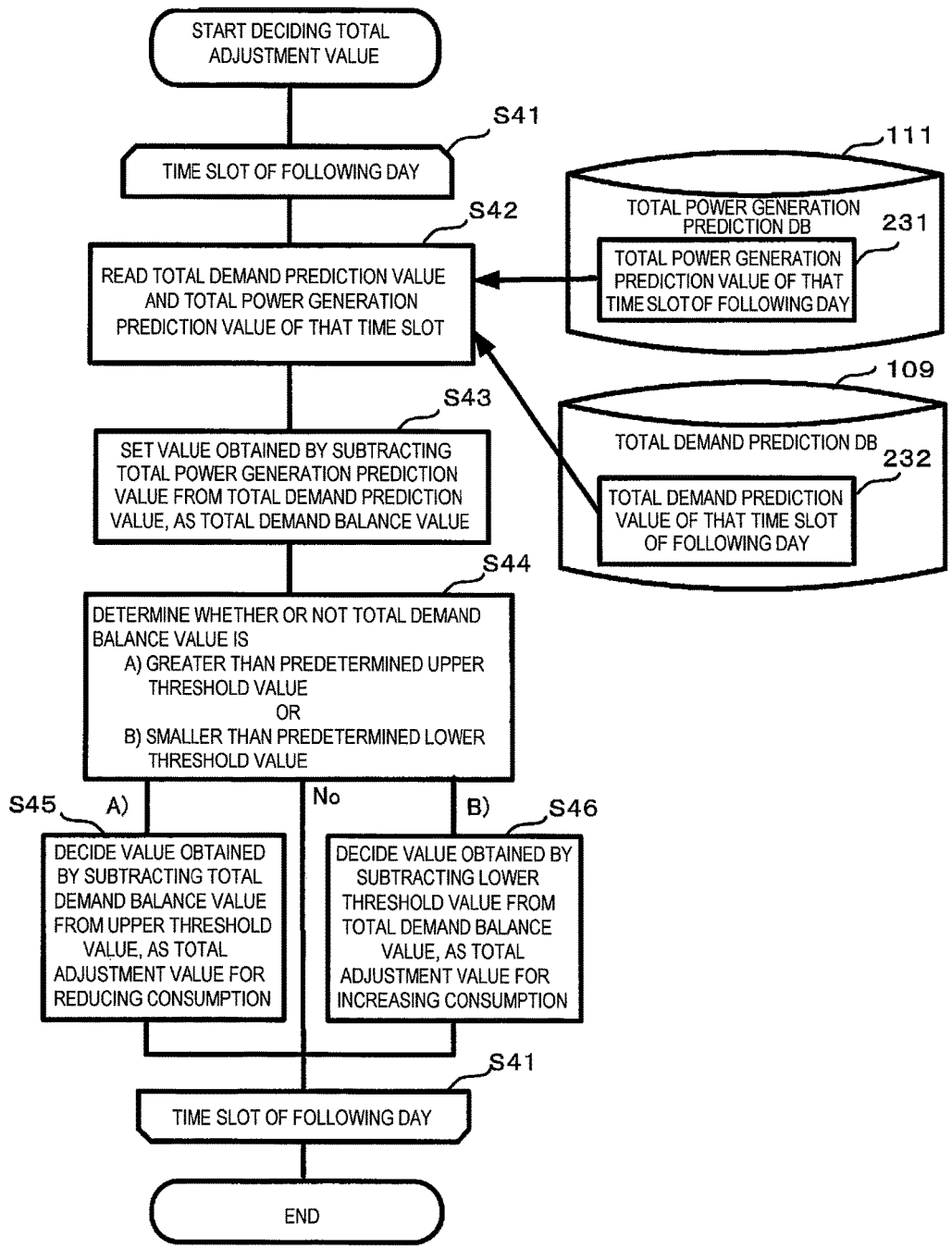
[FIG. 5]

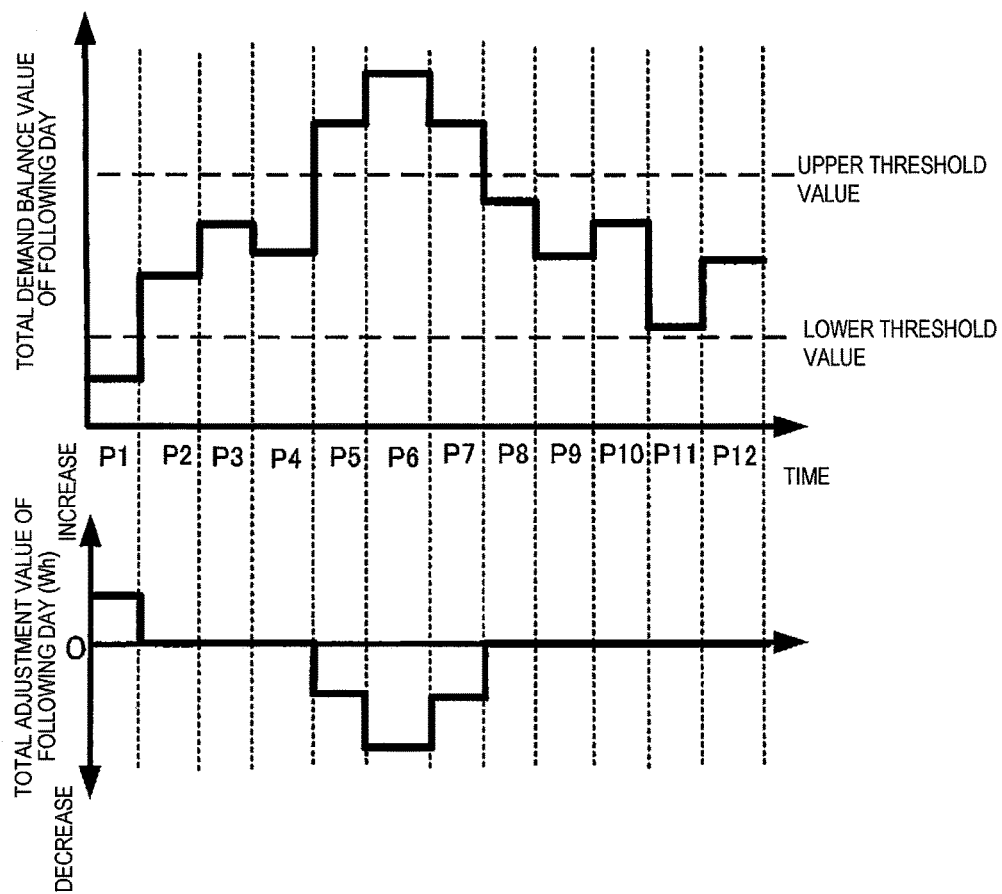
[FIG. 6]

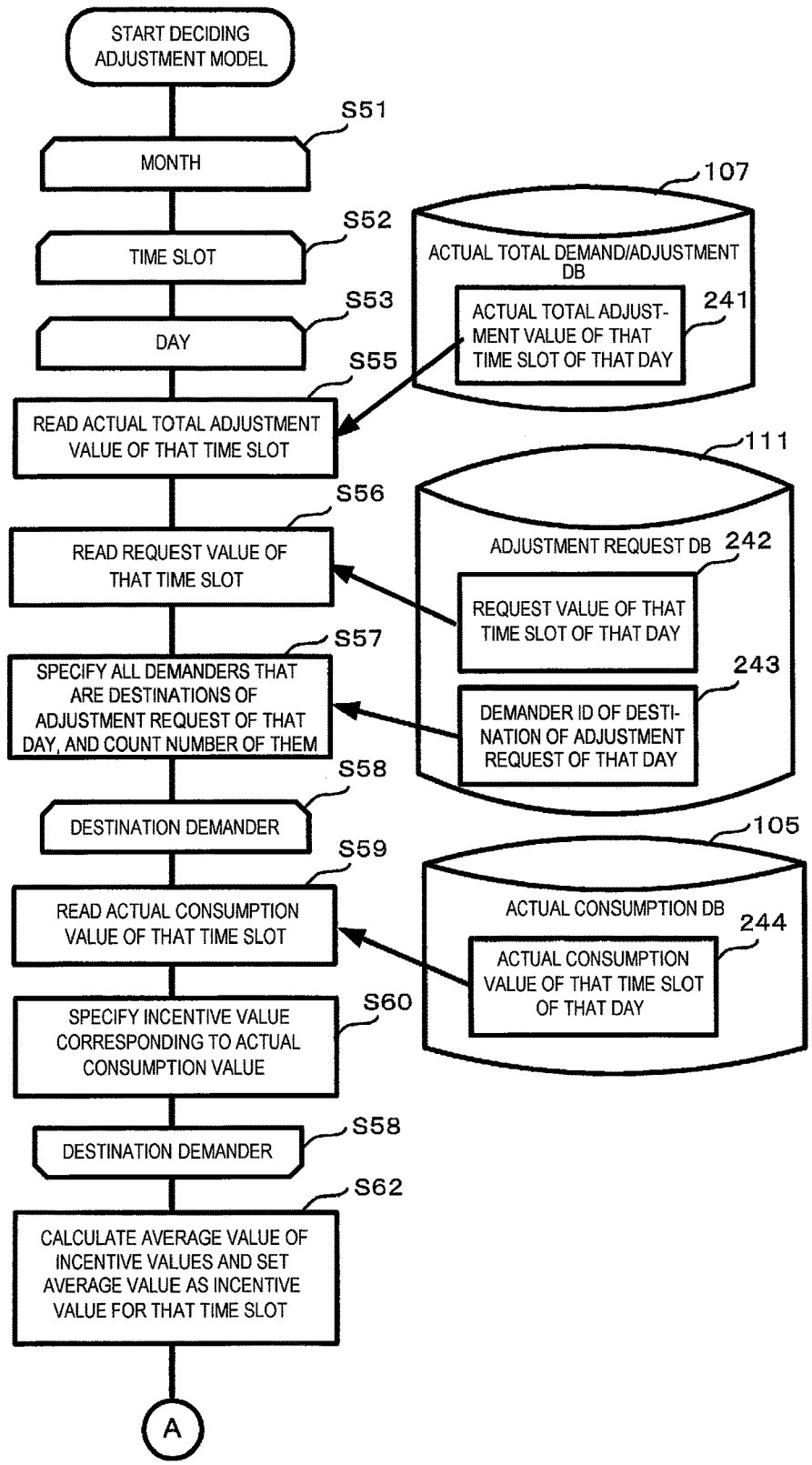
[FIG. 7]

[FIG. 8]
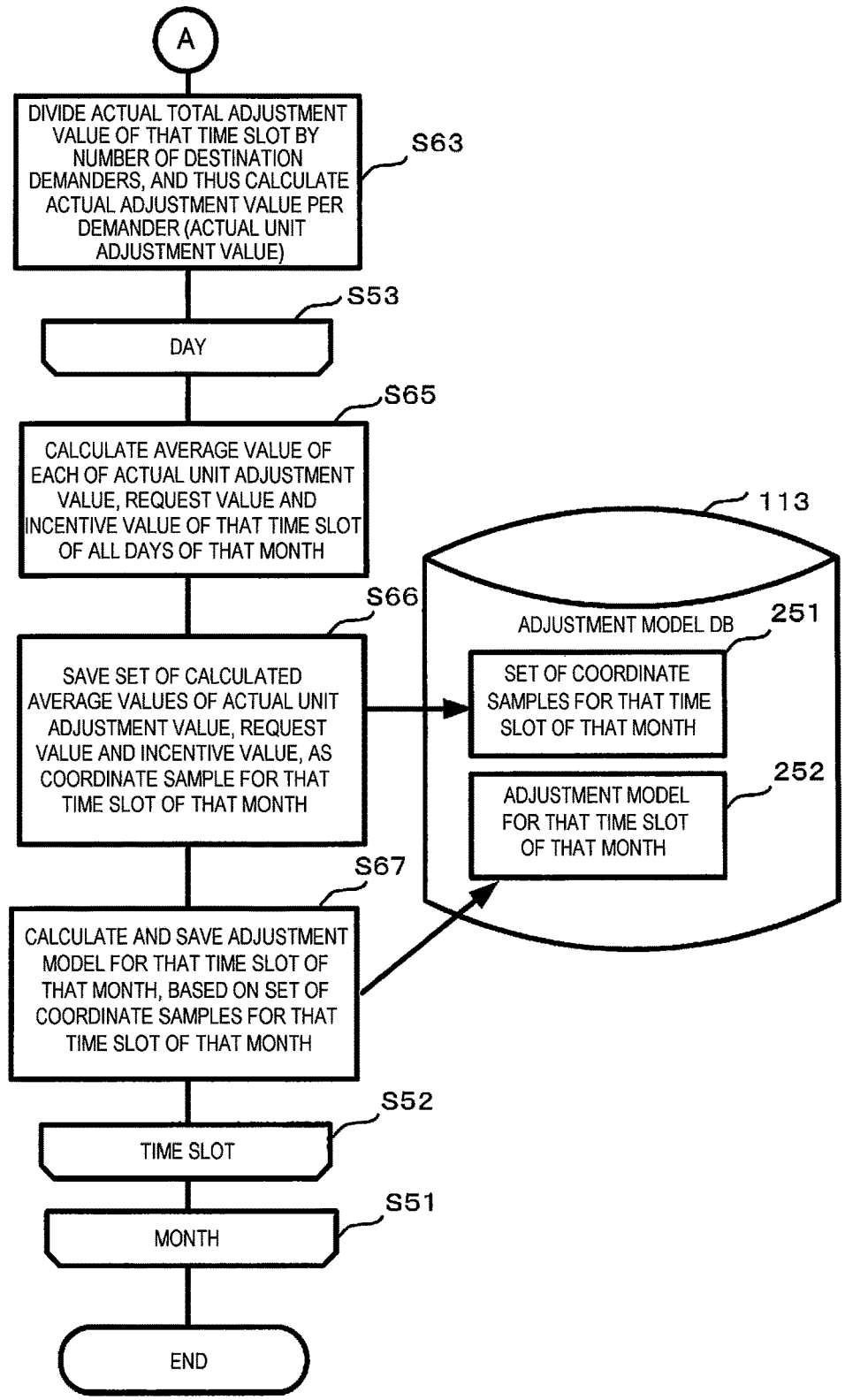

[FIG. 9]
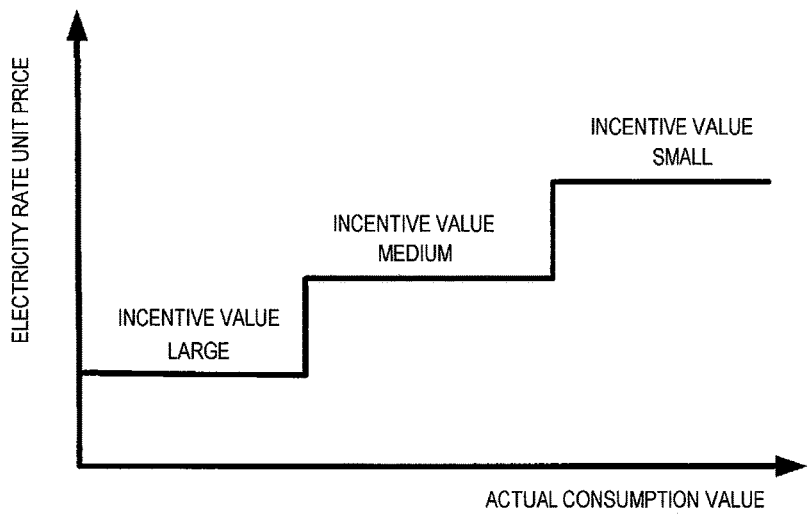
[FIG. 10]
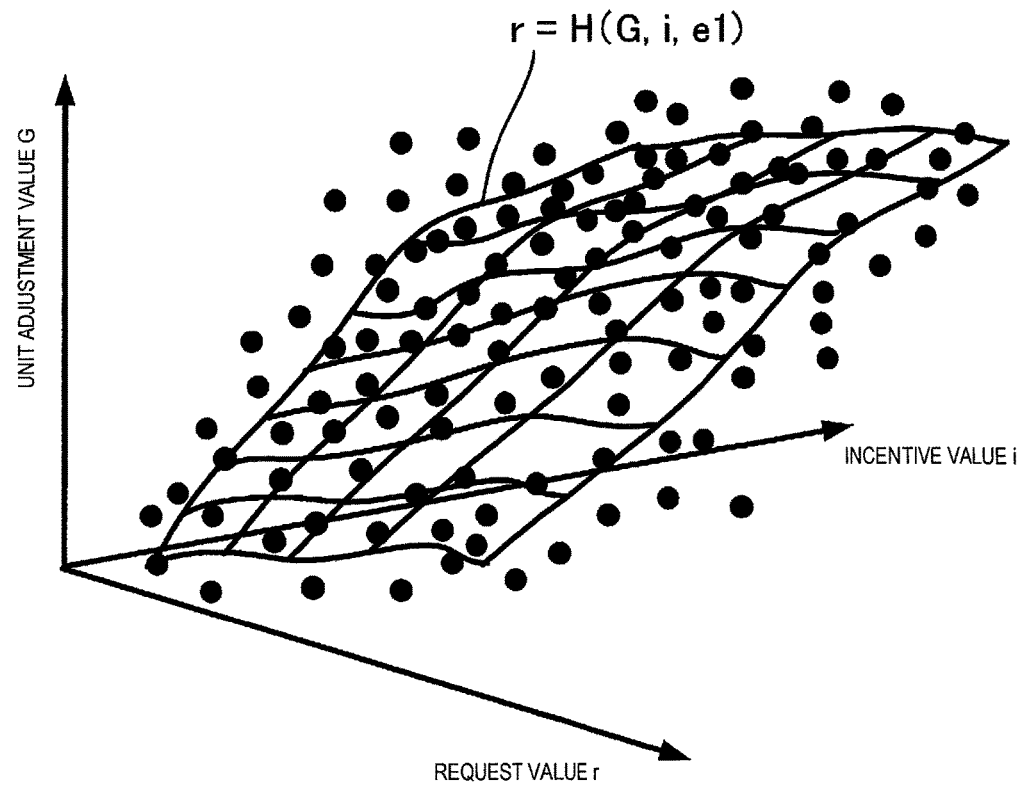

[FIG. 11]
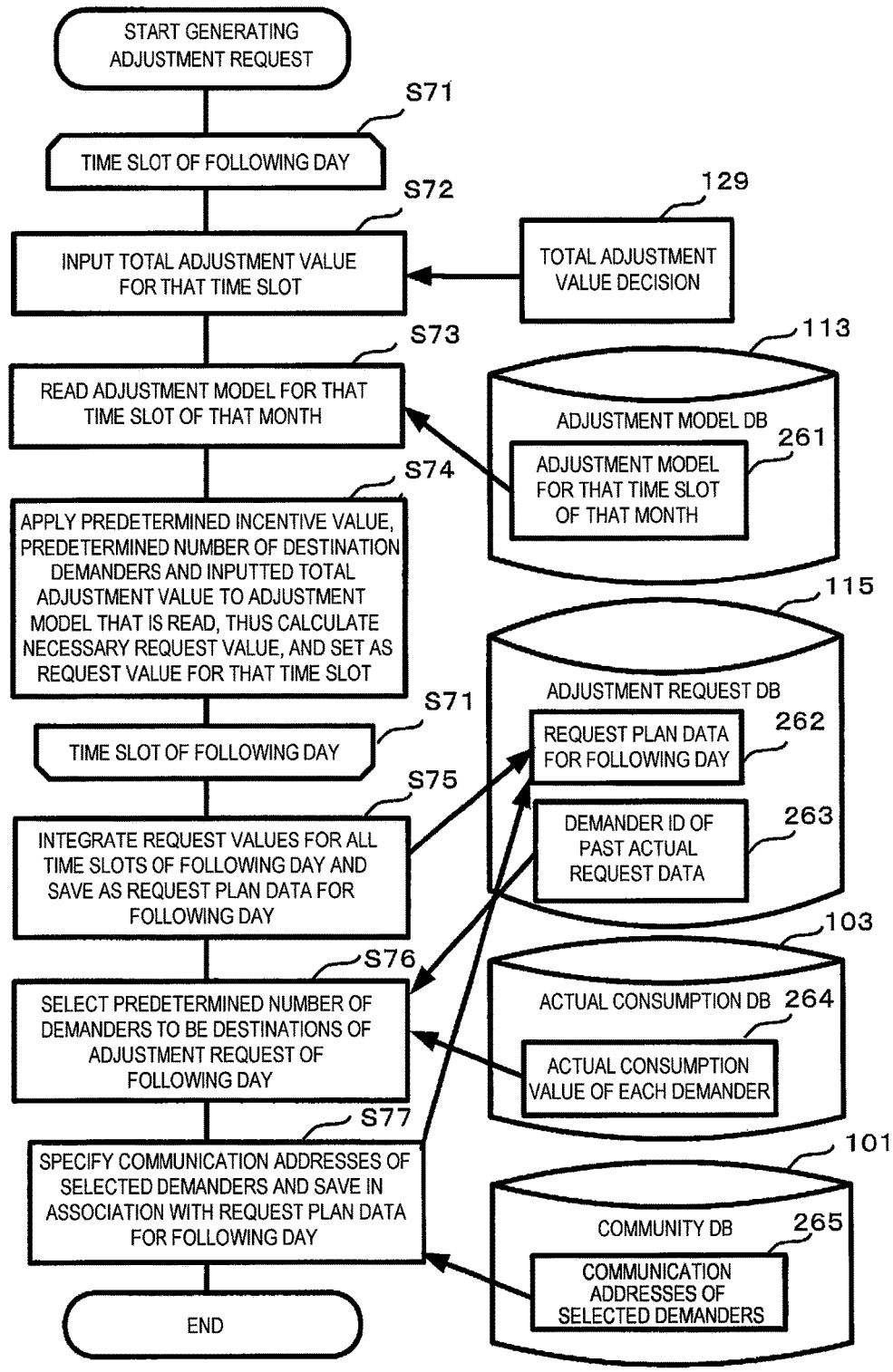

[FIG. 12]
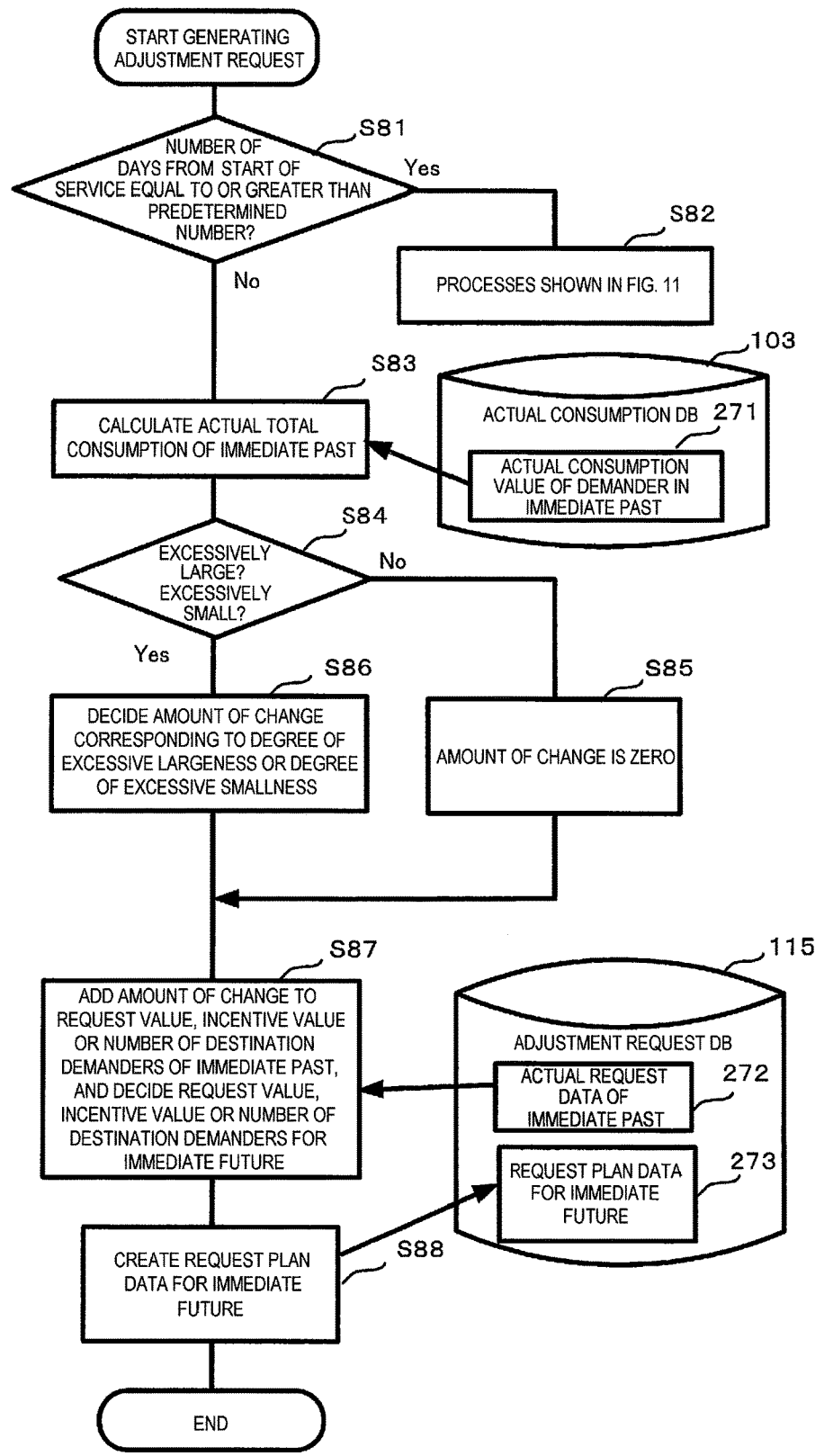

SYSTEM, METHOD AND COMPUTER PROGRAM FOR ENERGY CONSUMPTION MANAGEMENT

TECHNICAL FIELD

The present invention relates to a system, a method and a computer program for management (for example, prediction and/or adjustment) of consumption of energy such as electricity, gas and/or water.

BACKGROUND ART

Development of smart grid techniques is globally taking place mainly for the purpose of adaptation of energy distribution infrastructures to low-carbon society, reinforcement of stable supply and enhancement of economy. One of diverse smart grid techniques is demand side management in which demanders are requested to change the operating state of installed equipment, thus realizing relaxation of load concentration in the electric power system and utilization of surplus electricity based on dispersed power sources.

For example, Patent Literature 1 describes a demand side management technique. In this technique, if there is a time slot when load concentration is anticipated in the future such as the following day in an electric power supply system, demanders are requested to reduce energy consumption. Then, demanders that shift energy utilization to another time slot in response to the request are given an incentive such as being able to receive a discount on electricity rates as a reward. Consequently, reduction or dispersion of the load concentration state in the electric power supply system can be expected.

In demand side management, it is important to predict the size of demand in advance in order to properly decide the amount of reduction (in some case, the amount of increase) in energy consumption. Demand prediction is also important in order to properly define an energy supply plan.

Patent Literature 2 discloses that, based on a control signal that commands a demander's load equipment (for example, an air conditioning machine) to adjust load, a server for demand side management generates and stores operation result data of the load equipment (for example, start time and stop time, duration of operation, load factor, whether there is a load adjustment or not, result of load adjustment (for example, limiting the upper load limit to 70% of rated load) or the like), and carries out demand prediction for future and decision of a load adjustment range based on the past load operation result data.

Techniques for demand prediction are also disclosed in Patent Literatures 3, 4 and the like.

CITATION LIST

Patent Literature

PTL 1: JP-A-2007-334523
PTL 1: JP-A-2010-204833
PTL 2: JP-A-2011-24314
PTL 3: JP-A-2010-279160

SUMMARY OF INVENTION

Technical Problem

While demand prediction is important in order to implement demand side management properly, there is a problem that demand side management makes demand prediction difficult. This problem becomes more conspicuous in a public or collective energy management system, for example, a CEMS (Community Energy Management System) to manage energy demand in an entire community including many demanders, than in a personal or individual system for each demander, for example, a HEMS (Home Energy Management System) to manage energy in each household.

Whatever calculation method is used to make demand prediction, the past energy demand by demanders should be grasped in order to obtain a prediction result with high probability. However, in a method based on the provision to the CEMS from a demander's smart meter, it is the actual energy consumption by the demander and does not represent true energy demand by the demander. That is, when demand side management is carried out, the actual energy consumption by the demander is the energy consumption as a result of implementing intentional consumption adjustment and will often be different from the real energy demand by the demander.

Moreover, another factor which makes demand prediction difficult is a social constraint that the CEMS should not force demanders to adjust consumption. Even if the CEMS issues a consumption adjustment request to the community, not all demanders will necessarily adjust the amount of consumption in response to the request. Also, demanders can freely decide what degree of adjustment should be made. Therefore, it is difficult for the CEMS to grasp which demander made what degree of consumption adjustment in response to the request by the CEMS. It is difficult for the CEMS to specify the amount of consumption adjustment and the amount of real demand, based on the actual energy consumption provided from demanders' smart meters.

Thus, an object is to more properly predict future energy demand by an entire group of plural demanders, for example, a community.

Another object is to more properly adjust energy consumption by an entire group of plural demanders, for example, a community.

Solution to Problem

According to an embodiment of the invention, a consumption adjustment request to request each demander to make energy consumption adjustment is generated in order to adjust energy consumption by a community at a specific time in the future (for example, the following day or each time slot of the following day). As a destination demander of this consumption adjustment request, some demanders are selected from the community. Then, the consumption adjustment request is sent to those selected destination demanders.

In order to decide a content of the consumption adjustment request for the specific time in the future, energy demand in the community at the specific time in the future is predicted. This prediction is carried out as follows. That is, non-destination demanders that are not selected as a destination demander of a consumption adjustment request for a specific time in the past (for example, a past day when environmental conditions such as season and climate are similar to the following day, or each time slot of the past day) are specified. Actual energy consumption by those specified non-destination demanders at the specific time in the past is grasped. The actual energy consumption that is grasped can be assumed to represent real energy demand by those specified non-destination demanders at the specific time in the past. Therefore, based on the actual energy consumption by those non-specified destination demanders, demand in the community at the specific time in the future can be predicted.

As a modified example, a first time when energy consumption adjustment should be made and a second time when energy consumption adjustment should be stopped are decided, and demand in the community at the first time in the future is predicted based on actual energy consumption in the community at the second time in the past. Based on the demand prediction, a request for consumption adjustment at the first time in the past in the future is generated. Then, the consumption adjustment request is transmitted to demanders in the community.

Advantageous Effect of Invention

According to one aspect of the invention, future energy demand by a group of plural demanders such as a community can be predicted more properly.

According to another aspect of the invention, energy consumption by a group of plural demanders such as a community can be adjusted more properly.

BRIEF DESCRIPTION OF DRAWINGS

FIG. 1 shows the configuration of a preferred embodiment of the invention.

FIG. 2 It shows an operation flow of an actual total demand estimating unit 123.

FIG. 3 It shows an operation flow of a total demand predicting unit 125.

FIG. 4 It shows an operation flow of a total power generation predicting unit 127.

FIG. 5 It shows an operation flow of a total adjustment value deciding unit 129.

FIG. 6 It shows an example of a total adjustment value.

FIG. 7 It shows an operation flow of an adjustment model deciding unit 131.

FIG. 8 It shows the operation flow (continuation) of the adjustment model deciding unit 131.

FIG. 9 It shows an example of an incentive value.

FIG. 10 It shows an example of an adjustment model.

FIG. 11 It shows an operation flow of an adjustment request generating unit 133.

FIG. 12 It shows an operation flow of a modified example of the adjustment request generating unit 133.

DESCRIPTION OF EMBODIMENTS

Hereinafter, a preferred embodiment of the invention will be described. In the following, a system to manage electric power consumption is described. However, this system is an illustrative example for explanation. As a matter of course, the invention can be applied to consumption management of other energies than electricity, for example, gas and water. Also, in this description, the term "consumption" of electric power is used not only in a generally sense of consumption (positive consumption) but also in terms of production of electric power like power generation (negative consumption). Therefore, for example, an "electric power consuming apparatus" can include not only an apparatus which simply consumes electric power such as an air conditioning machine but also an apparatus which generates electric power such as a power generator.

FIG. 1 shows the configuration of a preferred embodiment of the invention.

In FIG. 1, a consumption adjustment server 100 is a server to collectively adjust electric power demand by plural or many demanders. In this description, as an illustrative example for explanation, the consumption adjustment server 100 is assumed to be a CEMS (Community Energy Management System) to manage electric power consumption in the entirety of a certain community including many demanders, or a part of the CEMS.

Such a consumption adjustment server 100 can communicate with many demander EMSs (demander energy management systems) 143 which individually manage electric power consumption by many demanders belonging to the community (for example, homes, buildings, factories, electric vehicles and the like), via a communication network 141. Each demander system 143 may be, for example, a HEMS (Home Energy Management System) to manage energy consumption in each household, BEMS (Building Energy Management System) to manage energy consumption in each building, FEMS (Factory Energy Management System) to manage energy consumption in each factory, EV-EMS (EV Energy Management System) to manage energy consumption in each electric vehicle or the like, or may be apart of these systems.

Here, each demander EMS 143 will be described before explaining details of the consumption adjustment server 100.

Each demander system 143 has a communication unit 151 which communicates with the consumption adjustment server 100, a consumption measuring unit 155 which measures, in real time, actual electric power consumption by one or plural electric power consuming apparatuses 153 owned by the demander, an actual consumption notifying unit 157 which notifies the consumption adjustment server 100, in real time or periodically, of the measured actual electric power consumption via the communication unit 141, a request receiving unit 159 which receives a request to adjust electric power consumption from the consumption adjustment server 100 via the communication unit 141, and a consumption adjusting unit 161 which takes in the received request and adjusts (reduces or increases) the electric power consumption by the one or plural electric power consuming apparatuses 153.

The consumption adjusting unit 161 of each demander system 143 determines whether or not to implement consumption adjustment in response to the request by the consumption adjustment server 100 in accordance with an instruction from the user (not shown) of the demander system 143 or a preset value, and carries out selection of the electric power consuming apparatus 153 to be adjusted and decision on the amount of adjustment in the case of implementing consumption adjustment.

Next, the consumption adjustment server 100 will be described in detail.

The consumption adjustment server 100 has a role of predicting total demand of electric power by the entire community in the future, generating a request for electric power consumption amount adjustment in advance based on the total demand prediction in order to adjust the total amount of electric power consumption in the entire community in the future to match the electric power supply to the community, and distributing the request to the community. In this embodiment, as an illustrative example for explanation, the consumption adjustment server 100 is configured to predict, every day, total demand of electric power by the entire community for every time slot (for example, every 30 minutes) of the following day, generates a consumption adjustment request to adjust the total consumption of electric power by the entire community for every time slot of the following day, and distribute the consumption amount adjustment for the following day to the community within the present day.

A point to be noted in the operation carried out by the consumption adjustment server 100 is that, when distributing the consumption adjustment request to the community, the destination is not all the demanders in the community but is limited to some selected demanders. In other words, every day, there are always demanders in the community which do not receive the consumption adjustment request. Actual consumption data of the demanders which do not receive the consumption adjustment request is assumed to be representing the real electric power demand by the demanders. Therefore, the consumption adjustment server 100 is configured to predict the total demand in the community, using the actual consumption data of the demanders which do not receive the consumption adjustment request.

The consumption adjustment server 100 can be realized by one or plural computer machines which have a micro processor and a storage device (neither of them shown) and in which the micro processor executes a predetermined computer program stored in the storage device. The consumption adjustment server 100 has databases 101 to 115 and functional units 121 to 133, described below.

Each of the databases 101 to 115 and the functional units 121 to 133 can be realized by the micro processor executing a predetermined computer program stored in the storage device in the one or plural computer machines, or by collaboration between such a software execution operation and an operation of predetermined hardware provided in or connected to the computer machine. Each of the databases 101 to 115 and the functional units 121 to 133 may be installed in a concentrated manner in one computer machine or may be installed in a dispersed manner in different computer machines.

Hereinafter, first, the databases 101 to 115 of the consumption adjustment server 100 will be described.

In the community data base 101, demander management data about many demanders belonging to the community is recorded. The demander management data of each demander includes, for example, the demander ID of each demander, the demander type (home, building, factory, or electric vehicle or the like), the content of the electric power consumption contract with the electric power supply company, the communication address of the demander EMS 143, the machine type and rated power consumption of one or plural electric power consuming apparatuses owned, or the like.

In the weather database 103, actual weather data showing the actual weather conditions (for example, case (weather type such as fine, cloudy or rain, sunshine duration, temperature and humidity), and weather forecast data showing a forecast for the following day in the past in the area where the community exists are organized and stored by day and by time slot (for example, every 30 minutes).

The consumption adjustment server 100 periodically receives actual weather data and weather forecast data from a predetermined weather information source (information distribution server of a weather information company) 145 via the communication unit 121 and stores these data in the actual weather database 105.

In the actual consumption database 105, actual consumption data showing actual electric power consumption [Wh] in the past by the many demanders in the community, collected from the many demander systems 143, are organized and stored by day and by time slot.

The consumption adjustment server 100 receives, in real time or in a ventilating manner, data showing the actual electric power consumption by the one or plural electric power consuming apparatuses 153 managed by the demander EMS 143, from each demander EMS 143 via the communication unit 121. Based on the received data, the actual consumption data by time slot of each demander is registered in the actual consumption database 105.

In the actual total demand/consumption database 107, an actual total demand value [Wh] of electric power of the entire community in the past (for example, yesterday) in the entire community and an actual total adjustment value [Wh] of electric power consumption, estimated every day by the actual total demand estimating unit 123 are organized and recorded by day and by time slot.

In the total demand prediction database 109, a total demand prediction value [Wh] of electric power of the entire community for the following day in the entire community, calculated every day by the total demand predicting unit 125, is organized and recorded by day and by time slot.

In the total power generation prediction database 111, a total power generation prediction value [Wh] of the entire community for the following day in the entire community, calculated every day by the total power generation predicting unit 127, is organized and recorded by day and by time slot.

In the adjustment model database 113, an adjustment model indicating an average consumption adjustment characteristic of the community, calculated every, day by the adjustment model deciding unit 131, is recorded. The adjustment model is a lookup table or a computational formula or the like which defines the correlation between a desired total consumption adjustment value of the entire community and one or more parameters that are necessary to obtain the desired total consumption adjustment value. The one or more parameters may be the number of demanders which receive the consumption adjustment request, the value of the consumption adjustment request (for example, a target value of consumption adjustment as indicated in "power consumption should be reduced X %"), and/or an incentive value given to these demanders (for example, the size of a reward as indicated in "the unit price of electric power will be discounted by X %").

The adjustment model employed in this embodiment is, as an example, a lookup table or a computational formula or the like which defines the request value of the consumption adjustment request as a function of the total consumption adjustment value, the incentive value and the number of demanders. By applying the total consumption adjustment value, the incentive value and the number of demanders to the adjustment model, a necessary request value for obtaining the total consumption adjustment value can be found. Details of the adjustment model will be described later.

In the adjustment request database 115, a consumption adjustment request for adjusting electric power consumption of the following day (for example, indicating a target value of consumption adjustment as in "power consumption should be reduced X %"), generated every day by the adjustment request generating unit 133, is stored together with the communication address of the demander selected by the adjustment request generating unit 133 as a destination of the request (that is, the communication address of the corresponding demander EMS 143).

The communication unit 111 reads out, every day, the consumption adjustment request for the following day together with the communication address of the destination thereof from the adjustment request database 115, and sends the consumption adjustment request to the demander EMS 143 of the destination within the day. Each demander EMS 143, receiving the consumption adjustment request, determines whether or not to agree to the request, and if it agrees, determines which time slot of the following day and what extend of consumption adjustment are to be applied to which electric power consuming apparatus 153, in accordance with the user's instruction or presetting, as described above. In accordance with the determination, the electric power consumption of the electric power consuming apparatus 153 is to be controlled the following day.

Next, the functional units 121 to 133 of the consumption adjustment server 100 will be described.

The communication unit 111 carries out processing to receive the actual weather data and weather forecast data every day from the weather information source 145 and store the received data in the weather database 103, processing to receive the actual consumption data of each demander in real time or periodically from each demander EMS 143 and store the received data in the actual consumption database 105, and processing to read out a consumption adjustment request and a destination address for the following day every day from the actual request database 115 and distribute the consumption adjustment request to the demander EMS 143 of the destination, as already described.

The actual total demand estimating unit 123, every day, estimates an actual total demand value and an actual total adjustment value of electric power for the entire community by time slot of yesterday, and stores the estimated actual total demand value and actual total adjustment value in the actual total demand/adjustment database 107.

Here, the total consumption value C [Wh] of electric power by the entire community can be expressed by the following formulas (1) and (2).

$$C = D(e) + F(r,i,n,e) \quad (1)$$

$$F(r,i,n) \approx n \times G(r,i,e) \quad (2)$$

Here, e is a multi-dimensional environment variable representing various environmental conditions such as season, day of the week and weather conditions, r is a request value for consumption adjustment sent to the demander (for example, a target value of electric power consumption adjustment as in "electric power consumption should be reduced X %"), i is an incentive value given to the demander (for example, a discount amount or discount rate on electric power price), n is the number of destination demanders to which the consumption adjustment request is sent, D(e) is the real electric power demand in the entire community (a total consumption value in the case where no consumption adjustment is made in response to the request by the consumption adjustment server 100) [Wh] and is a function of the environment condition e, F(r, i, n, e) is a total adjustment value [Wh] of electric power consumption in the entire community, obtained as a result of adjustment of consumption made by demanders in the community in response the consumption adjustment request, and is a function of the request value r, the incentive value i, the number of destination demanders n, and the environment variable e, and G(r, i, e) is an adjustment value [Wh] of electric power consumption by one average demander, obtained as a result of adjustment of consumption made by the one average demander (a virtual demander having an average consumption adjustment characteristic among all the demanders in the community) in response to the consumption adjustment request, and is a function of the request value r, the incentive value i, and the environment variable e.

The actual values of D(e) and F (r, i, n, e) of yesterday in the above formula (I) are equivalent to the actual total demand value and the actual total adjustment value of yesterday estimated by the actual total demand estimating unit 123.

FIG. 2 shows an operation flow of the actual total demand estimating unit 123. The outline thereof is as follows.

In order to estimate the actual total demand value of yesterday, the actual total demand estimating unit 123 refers to the adjustment request database 115 and thereby selects demanders that are not the destinations of yesterday's consumption adjustment request (that is, which do not receive the request), from the many demanders belonging to the community. The actual total demand estimating unit 123 estimates the actual total demand value of yesterday for the entire community, based on the actual consumption by those selected demanders recorded in the actual consumption database 105. Moreover, the actual total demand estimating unit 123 calculates the actual total consumption value of yesterday for the entire community, based on the actual consumption data of yesterday in the actual consumption database 105. Then, the actual total demand estimating unit 123 calculates the actual total adjustment value of yesterday for the entire community, based on the above estimated actual total demand value of yesterday and the above calculated actual total consumption value of yesterday.

Referring again to FIG. 1, the total demand predicting unit 125, every day, predicts a total demand value of the entire community by time slot of the following day and stores the predicted total demand prediction value in the total demand prediction database 109. The total demand prediction value is equivalent to the prediction value of the following day D (e) in the above formula (I).

FIG. 3 shows an operation flow of the total demand predicting unit 125. The outline thereof is as follows.

In order to predict the total demand of the following day, the total demand predicting unit 125 refers to the weather forecast data of the following day and the actual weather data of multiple days in the past, recorded in the weather database 103, and selects plural days in the past having similar weather conditions and season to the following day. Then the total demand predicting unit 125 predicts the total demand in the entire community for the following day, based on the actual total demand value of those selected days with similar conditions, recorded in the actual total demand/adjustment database 107.

Referring again to FIG. 1, the total power generation prediction 127, every day, predicts a total power generation value [Wh] of the entire community by time slot of the following day and stores the predicted total power generation prediction value [Wh] in the total power generation prediction database 111.

FIG. 4 shows an operation flow of the total power generation predicting unit 127. The outline thereof is as follows.

The total power generation prediction 127 refers to the community database 101 and grasps the power generation capability value of many solar power generation apparatuses existing in the community. Then, the total power generation prediction 127 predicts the total amount of power generation [Wh] by time slot of the following day, based on the machine type and the power generation capability value of those solar power generation apparatuses and in consideration of the sunshine duration of the following day recorded in the weather database 103.

The total adjustment value deciding unit 129, every day, decides a total adjustment value [Wh] indicating a target value (desired value) of consumption adjustment (reduction or increase in consumption) for the entire community by time slot of the following day. This total adjustment value is equivalent to the target value of the following day F(r, i n, e) in the above formula (I).

FIG. 5 shows an operation flow of the total adjustment value deciding unit 129. The outline thereof is as follows.

The total adjustment value deciding unit 129 calculates a net total demand value of the entire community (a total demand value [Wh] as a remainder after consuming the entirety of the total power generation in order to meet the demand, and hereinafter referred to as a total demand balance value), based on the total power generation prediction value [Wh] of the following day recorded in the total power generation prediction database 111 and the total demand prediction value [Wh] of the following day stored in the total demand prediction database 109. Then, the total adjustment value deciding unit 129 determines whether or not the total demand balance value [Wh] of the following day departs from a range between an upper threshold value and a lower threshold value of the amount of electric power [Wh] that can be supplied to the community from the electricity supply system. If the value is consequently determined as departing, the total adjustment value deciding unit 129 decides the total adjustment value of the following day to offset the departure.

Referring again to FIG. 1, the adjustment model deciding unit 131 creates an adjustment model as described above for each environmental conditions (in this embodiment, for example, the average weather condition of each month from January to December (in other words, each season)) and registers the adjustment model in the adjustment model database 113. Then, the adjustment model deciding unit 131 updates the adjustment model in the adjustment model database 113 every day.

FIG. 7 and FIG. 8 show an operation flow of the adjustment model deciding unit 131. The outline thereof is as follows.

The adjustment model deciding unit 131 grasps the actual total adjustment value by time slot of each day of each month in the past, referring to the actual total demand/adjustment database 107, and also grasps the demand value and the number of destination demanders of the consumption adjustment request for each time slot of each day of each month in the past, referring to the adjustment request database 111. Moreover, the adjustment model deciding unit 131 grasps the actual consumption value of each destination demander in each time slot of each day of each month in the past, referring to the actual consumption database 105, and specifies the incentive value given to each destination demander for each time slot of each day, based on those actual consumption values.

By the way, in this embodiment, as an example of the incentive value, a discount rate or discount amount on the electricity rate unit price decided in accordance with the actual consumption value for each time section (for example, every day, every time slot) is employed. A specific example thereof is shown in FIG. 9. In this specific example, as the actual consumption value becomes smaller, the unit price of the rate becomes cheaper, that is, the incentive value becomes greater.

The actual total adjustment value in each time slot of each day of each month in the past, the request value, the number of destination demanders, and the incentive value for each destination demander, grasped as described above, are equivalent to samples of the F value, r value, n value and i value corresponding to each day under a condition that the environment variable e is fixed, in the above formulas (1) and (2). Using such sets of samples for many days in each month, the adjustment model deciding unit 131 finds an adjustment model by month and by time slot in the form of a lookup table or a computational formula, by a predetermined statistical computation method, for example, the minimum square method.

FIG. 10 shows a specific example of the adjustment model employed in this embodiment. This adjustment model is a lookup table or a computational formula which defines a request value r of a consumption adjustment request as a function H(G, i) of a consumption adjustment value G per single average demander receiving the request (hereinafter, referred to as a unit adjustment value) and the incentive value i given to the demander. That is, when a consumption adjustment request having a request value r and an incentive having a value i are given to one average demander, the consumption adjustment value G expected to be obtained from the average demander is defined by $$G=G(r,i,e) \tag{3}$$

If this formula (3) is modified to express the request value i, the consumption adjustment value G and the incentive value as a function of the environment variable e, $$i=H(G,i,e) \tag{3}$$

holds. If a specific environment variable e1 (for example, a set of an average weather condition of a specific month and a specific time slot of the day) is substituted into the environment variable e in this formula (3), the following formula (4) that can be applied to the specific environmental condition (for example, a specific time slot of a specific month) is obtained.

$$i=H(G,i,e1) \tag{4}$$

The adjustment model H(G, i) shown in FIG. 10 is equivalent to G(r, i, e1) in the above formula (4).

The adjustment model H(G, i) shown in FIG. 10 can be used as follows.

That is, if a desired total consumption adjustment value for the entire community is F, an average consumption adjustment value (unit adjustment value) G per demander is found by diving the total consumption adjustment value F by the number of demanders n to which the consumption adjustment request is to be given. Then, if the unit adjustment value G and the average incentive value i received by those demanders are applied to the above adjustment model H(G, i), a necessary request value r to obtain the desired total consumption adjustment value F is calculated.

Referring again to FIG. 1, the adjustment request generating unit 133, every day, decides a request value of a consumption adjustment request to be distributed to the community in order to equalize the actual total adjustment value of the entire community for the following day to the total adjustment value of the following day decided by the total adjustment value deciding unit 129, selects demanders to be destinations of the consumption adjustment request of the following day, from the community, and then stores request plan data showing the decided request value of the following day in association with the communication addresses of those selected destination demanders in the adjustment request database 115.

FIG. 11 shows an operation flow of the adjustment request generating unit 133. Points to be noted in the operation are as follows.

The adjustment request generating unit 133, every day, selects not all the demanders in the community but only some demanders as destinations of an adjustment request. Since the demanders that are not selected as destinations do not receive the consumption adjustment request, the actual consumption by those demanders may be regarded as the real demand by those demanders and therefore is used as basic data for total demand prediction by the total demand predicting unit 125.

Also, the adjustment request generating unit 133, every day, grasps the number of times or the degree of frequency at which each demander is selected as a destination in the past, referring to the actual request data in the past in the adjustment request database 115, and determines which demander should be selected as a destination of a future request in accordance with the number of times or the degree of frequency. Thus, destinations of adjustment requests can be dispersed among different demander. Therefore, the problem of excessive concentration of requests on the same demanders, causing saturation of the effect of the consumption adjustment request, can be reduced.

Also, the adjustment request generating unit 133, every day, determines which demander should be selected as a destination of a future request, referring to the actual consumption database 103 and according to the actual consumption value in the past of each demander, that is, according to the incentive value estimated from the actual consumption value. Thus, a request can be sent preferentially to demanders having a relatively small incentive value. Therefore, the problem that a request goes again to demanders which already adjust consumption to the limit, thus causing saturation of the effect of the consumption adjustment request, can be reduced. Also, the effect of the consumption adjustment can be obtained while reducing the cost for the incentive.

Hereinafter, the operations of the functional units 123 to 133, except the communication unit 121, will be described further in detail.

FIG. 2 shows the operation flow of the actual total demand estimating unit 123.

The actual total demand estimating unit 123, every day, repeats a loop process S1 for each time slot with respect to all the time slots of yesterday. In the loop process S1 for each time slot, a loop process S2 for each demander is repeated with respect to all the demanders in the community. After that, processes of steps S7 and S8 are carried out.

In the loop process S2 for each demander, an actual consumption value 201 of the time slot concerned of yesterday corresponding to the demander concerned is read from the actual consumption database 105 (S3). After that, referring to a demander ID 202 of demanders that are destinations of a consumption adjustment request of yesterday (this was sent the day before yesterday), recorded in the adjustment request database 115, whether the demander concerned is a destination of the consumption adjustment request of yesterday or not (S4).

If the demander concerned is a destination (that is, received the consumption adjustment request of yesterday) as a result of the above determination, the actual consumption value 202 that is read is added to a total consumption value (the initial value at the start of the loop process S2 for each demander is zero) (S5). Meanwhile, if the demander concerned is not a destination (that is, did not receive the consumption adjustment request of yesterday), the actual consumption value 202 that is read is added to both a partial demand value (the initial value at the start of the loop process S2 for each demander is zero) and the above total consumption value.

When the execution of the loop process S2 for each demander is finished with respect to all the demanders, the above partial demand value represents the total value of the actual consumption values (real demand value) in the time slot concerned with respect to the demanders which are not destinations of yesterday's request (some demanders in the community), and the above total consumption value represents the total value of the actual consumption values with respect to all the demanders in the community.

In the subsequent step S7, the partial demand value is multiplied by a ratio of the number of all the demanders in the entire community to the number of the some demanders which are not destinations. Thus, the partial demand value is expanded to a value that can be regarded as the total value of the demand values of all the demanders in the entire community. The expanded value is stores in the actual total demand/adjustment database 107, as an actual total demand value 203 of the entire community in the time slot concerned of yesterday. Here, the "number of demanders" for determining the above "ratio" may be literally a simple demander count value, or may be a value obtained by applying weighting based on the potential electric power consumption ability of each demander which is decided according to the rated power or the number of the electric power consuming apparatuses owned by each demander, to the above demander count value. For example, if the number of demanders in a typical home is "1", the number of demanders in a factory having an approximately 10 times the potential electric power consumption ability of the home can be "10".

Moreover, in step S8, the above actual total demand value 202 is subtracted from the above total consumption value, and the difference value is stored in the actual total demand/adjustment database 107 as an actual total adjustment value 204 of the entire community in the time slot concerned of yesterday.

When the execution of the loop process S1 for each time slot is finished with respect to all the time slots of yesterday, the actual total demand value 202 and the actual total adjustment value 204 with respect to all the time slots of yesterday are stored in the actual total demand/adjustment database 107.

FIG. 3 shows the operation flow of the total demand predicting unit 125.

The total demand predicting unit 125 specifies plural days in the past having similar weather conditions and season to the following day, referring to weather conditions 211 of the following day shown by the weather forecast data, and weather conditions 212 of multiple days in the past shown by the actual weather data in the weather database 103 (S11). After that, a loop process S12 for each time slot is repeated with respect to all the time slots of the day. In the loop process S12 for each time slot, a loop process S13 for each day is repeated with respect to all the similar days specified in step S11. After that, step S15 is executed.

In the loop process S13 for each day, an actual total demand value 213 for the time slot concerned of the day concerned is read out from the actual total demand/adjustment database 107 (S14).

After that, in step S15, the all actual total demand values 213 for the time slot of all the similar days, readout from the actual total demand/adjustment database 107, are totaled. Then, the average value is calculated from the total value and the average value is stored in the total demand prediction database 109, as a total demand prediction value 214 of the entire community for the time slot concerned of the following day.

When the loop process (S12) for each time slot is finished with respect to all the time slots of the day, the total demand prediction value 214 is stored with respect to all the time slots of the following day.

FIG. 4 shows the operation flow of the total power generation predicting unit 127.

The total power generation prediction 127 repeats a loop process S21 for each demander with respect to all the demanders in the community. In the loop process S21 for each demander, a loop process S22 for each solar power generation apparatus is repeated with respect to all the solar power generation apparatuses owned by the demander concerned. In the loop process S22 for each solar power generation apparatus, a power generation capability value 221 of the solar power generation apparatus concerned is read out from the community database 101 (S23). Thus, the power generation capability values 221 of all the solar power generation apparatuses existing in the community are read out.

In step S26, the power generation capability values 221 of all the solar power generation apparatuses in the community are totaled, and the total value is set as a total power generation capability value.

After that, a loop process S27 for each time slot is repeated with respect to all the time slots of the following day. In the loop process S27 for each time slot, a sunshine duration 222 of the time slot concerned of the following day is read out from the weather database 103 (S28). Then, based on the sunshine duration that is read out and the above total power generation capability value (for example, if the total power generation capability value represents the total power generation amount per unit sunshine duration, by multiplying the total power generation capability value by the sunshine duration), the total power generation value [Wh] for the time slot concerned of the following day is found. The resulting total power generation amount [Wh] is stored in the total power-generation prediction database 11, as a total power generation prediction value 223 for the time slot concerned of the following day.

When the loop process S27 for each time slot is finished with respect to all the time slots of the following day, the total power generation prediction values 223 for all the time slots of the following day are stored in the total power generation prediction database 11.

FIG. 5 shows the operation flow of the total adjustment value deciding unit 129.

The total adjustment value deciding unit 129 repeats a loop process S41 for each time slot with respect to all the time slots of the following day. In the loop process S41 for each time slot, the following processes are carried out.

A total power generation prediction value [Wh] 231 for the time slot concerned of the following day is read out from the total power generation prediction database ill, and a total demand prediction value [Wh] 232 for the time slot concerned of the following day is read out from the total demand prediction database 109 (S42). Then, the total power generation prediction value [Wh] 231 is subtracted from the total demand prediction value [Wh] 232, and the difference value is set as a total demand balance value for the time slot concerned of the following day (S43).

After that, the total demand balance value is compared with an upper threshold value and a lower threshold value of the amount of electric power that can be supplied to the community in the time slot concerned. In this embodiment, an example, the upper threshold value and the lower threshold value are fixed values that are predetermined based on the capacity of the equipment of the electric power distribution system for the community.

If the total demand balance value is greater than the upper threshold value as a result of the above comparison, a negative difference value obtained by subtracting from the total demand balance value from the upper threshold value is set as a total adjustment for reducing consumption in the time slot concerned. If the total demand balance value is smaller than the lower threshold value as a result of the above comparison, a positive difference value obtained by subtracting the total demand balance value from the lower threshold value is set as a total adjustment value for increasing consumption in the time slot concerned. If the total demand balance value is equal to or smaller than the upper threshold value and equal to or greater than the lower threshold value as a result of the above comparison, zero is set as the total adjustment value for the time slot concerned.

When the loop process S41 for each time slot is finished with respect to all the time slots of the following day, the total adjustment value for all the time slots of the following day is set and the total adjustment value is inputted to the adjustment request generating unit 133.

FIG. 6 shows an example of the total demand balance value and the total adjustment value for all the time slots of the following day.

In the example shown in FIG. 6, the total adjustment value has a positive value in a time slot P1 (adjustment value for increasing consumption), has a negative value in time slots P5 to P7 (adjustment value for reducing consumption), and is zero in the other time slots (no consumption adjustment is needed).

FIGS. 7 and 8 show the operation flow of the adjustment model deciding unit 131.

The adjustment model deciding unit 131 repeats a loop process S51 for each month with respect to the twelve months from January to December. In the loop process S51 for each month, a loop process S52 for each time slot is repeated with respect to all the time slots of the day. In the loop process S52 for each time slot, a loop process S53 for each day is repeated with respect to all the days of the month concerned in the past one year or plural years. After that, processes of steps S65 to S67 are carried out.

In the above loop process S53 for each day, processes of steps S55 to S57 are carried out. After that, a loop process S58 for each demander is repeated with respect to all the demanders that are destinations of the consumption adjustment request of the day concerned. After that, processes of steps S62 and S63 are carried out.

In the above loop process S53 for each day, an actual total adjustment value 241 for the time slot concerned of the day concerned is read out from the actual total demand/adjustment database 107 in step S55. Also, in step S56, a request value 242 for the time slot concerned indicated by the consumption adjustment request of the day concerned is read out from the adjustment request database 111. Moreover, in step S57, the demander IDs of destination demanders of the consumption adjustment request of the day concerned recorded in the adjustment request database 111 are read out, and based on those demander IDs, the destination demanders of the consumption adjustment request are specified and the number of those destination demanders is counted.

After that, the loop process S58 for each destination demander is repeated with respect to all the destination demanders specified in step S57.

In the loop process S58 for each destination demander, an actual consumption value 244 of the demander concerned for the time slot concerned of the day concerned is read out from the actual consumption database 105 in step S59. Then, in step S60, an incentive value corresponding to the actual consumption value 244 is specified.

FIG. 9 shows an incentive value employed as an example in this embodiment.

In the example shown in FIG. 9, an electricity rate unit price is set according to the actual consumption value per time slot in such a way that the electricity rate unit price is cheaper as the actual consumption value per time slot is smaller. The cheapness (discount amount or discount rate) of the electricity rate unit price, thus set, is equivalent to the incentive value.

Referring again to FIGS. 7 and 8, the loop process S58 for each destination demander is repeated with respect to all the destination demanders specified in step S57, thus obtaining the incentive values for all the destination demanders that are destinations of the request of the day concerned. In step S62, the average value of those incentive values is calculated and the average value is set as the incentive value for the time slot concerned of the day concerned. Also, in step S63, the actual total adjustment value for the time slot concerned of the day concerned, read in step S55, is divided by the number of destination demanders of the day concerned, specified in step S57. Thus, the actual adjustment value per demander (actual unit adjustment value) for the time slot concerned of the day concerned is calculated.

As the loop process S53 for each day is repeated with respect to all the day of the month concerned, the actual unit adjustment value (G), the request value (r) and the incentive value (i) with respect to the time slot concerned for all the days of the month concerned are obtained. In step S65, based on those values obtained, the average value of the actual unit adjustment values (G), the average value of the request values (r) and the average value of the incentive values (i) of the month concerned are calculated.

After that, in step S66, a set of the average value of the actual unit adjustment values (G), the average value of the request values (r) and the average value of the incentive values (i) calculated in step S65 is stored in the adjustment model database 251, as a coordinate sample 251 for the time slot concerned in the month concerned. Here, a coordinate sample means a coordinate sample in a three-dimensional coordinate system having the coordinate axis of the actual unit adjustment value (G), the coordinate axis of the request value (r) and the coordinate axis of the incentive value (i), as illustrated in FIG. 10. In FIG. 10, each coordinate sample is plotted as a black dot.

In the adjustment model database 251, many coordinate samples for the time slot concerned of the month concerned that are already calculated are stored. In step S67, based on the many coordinate samples for the time slot concerned of the month concerned, an adjustment model 252 for the time slot concerned of the month concerned is calculated by a statistical computation method, for example, the minimum square method. In this embodiment, the adjustment model 252 is a lookup table or calculation formula which defines the request value r of the as a function $H(G, i, e1)$ of the unit adjustment value G and the incentive value i under a condition that the environment variable e is fixed to a unique value e1 for the time slot concerned of the month concerned, as illustrated in FIG. 10. The calculated adjustment model 252 for the time slot concerned of the month concerned is stored in the adjustment model database 252.

When the loop process S52 for each time slot is finished with respect to all the time slots of the day, the adjustment models 252 for all the time slots of the month concerned are stored in the adjustment model database 252. Then, as the loop process S51 for each month is finished with respect to all the months from January to December, the adjustment models 252 for all the time slots are stored in the adjustment model database 252 with respect to all the months from January to December.

FIG. 11 shows the operation flow of the adjustment request generating unit 133.

The adjustment request generating unit 133 repeats a loop process S71 for each time slot with respect to all the time slots of the following day and subsequently executes processes of steps S75 to S77.

In the loop process S71 for each time slot, a total adjustment value for the time slot concerned is inputted from the total adjustment value deciding unit 129 (S72) and an adjustment model 261 for the time slot concerned of the month to which the following day belongs is read from the adjustment model database 113 (S73). Then, in step S74, a set of a predetermined incentive value, a predetermined number of destination demanders (smaller than the total number of demanders in the community) and the total adjustment value inputted in step S72 is applied to the adjustment model 261 read in step S73. Consequently, a request value to realize the total adjustment value inputted in step S72 is calculated and the calculated request value is set as the request value for the time slot concerned of the following day.

When the loop process S71 for each time slot is finished with respect to all the time slots of the day, the request values for all the time slots of the following day are set.

After that, in step S75, the request values for all the time slots of the following day that are set are integrated to create request plan data 262 for the following day, and this data is stored in the adjustment request database 115.

After that, in step S76, past actual request data (data showing the request values of consumption adjustment requests distributed respectively on multiple days in the past) 263 in the adjustment request database 115 is referred to. Additionally (or alternatively), the actual consumption values in the past for many demanders in the community are referred to in the actual consumption database 264. Then, based on the information that is referred to, a predetermined number of demanders (for example, the same number as the number of destination demanders used in step S74 and smaller than the total number of demanders in the community) to be destinations of the consumption adjustment request of the following day are selected. Here, for example, based on the past actual request data, demanders which became request destinations in the past by a number of times or at a frequency equal to or greater than a predetermined threshold value are eliminated from selection targets. Additionally (or alternatively), for example, based on the past actual consumption value (or the corresponding incentive value) of each demander, demanders with a past actual consumption value smaller than a predetermined threshold value (or a corresponding incentive value greater than a predetermined threshold value) are eliminated from selection targets. Consequently, a predetermined number of demanders are selected as destinations of the request of the following day without excessive concentration on the same demanders or excessive concentration on demanders with a relatively large incentive value. The communication addresses of the selected destination demanders are stored in the adjustment request database 115 in association with the request plan data 262 for the following day.

In the above step 76, the following method may also be employed as a modified example of the method for selecting destination demanders. This method aims to stabilize the electricity supply voltage to the community at a prescribed voltage over the entire community. That is, the layout of each in-community demander on an electric power distribution network that is already known (for example, the layout of many electric power distribution lines forming the electric power distribution network, the distance of each demander from a substation along the electric power distribution line, or the like) is recorded in the community database 101 in advance. In step 76, the layout of each demander on the electric power distribution network is grasped with reference to the community database 101. Also, the past actual consumption of each demander (particularly, of a past day having similar environmental conditions to tomorrow) is grasped with reference to the actual consumption database 105. Moreover, based on the information about the power generation equipment of each demander recorded in the community database 101 and weather forecast data for tomorrow recorded in the weather database 103, the power generation value of each demander for tomorrow may be grasped. Then, based on the layout of each demander on the electric power distribution network and the past actual consumption that are grasped, the past distribution of electricity supply voltage on the electric power distribution network (for example, of a past day similar to tomorrow) can be estimated and this can be used as a prediction of the distribution of electricity supply voltage on the electric power distribution network for tomorrow. Moreover, considering the power generation value for tomorrow in addition to the past distribution of electricity supply voltage on the electric power distribution network, the distribution of electricity supply voltage on the electric power distribution network for tomorrow may be predicted. Based on this prediction of voltage distribution, which demander existing at which position on the electricity distribution network should be requested to make electric power consumption adjustment is decided in order to equalize the predicted voltage distribution to a prescribed voltage. Destination demanders can be decided according to this decision.

After destination demanders are thus decided, according to the request plan data stored in the adjustment request database 115 and the communication addresses of the destination demanders associated with the request plan data, the communication unit 121, within that day, creates a consumption adjustment request for the following day and sends the consumption adjustment request to the communication addresses of those destination demanders.

Meanwhile, for a while after the service of the consumption adjustment server 100 is started, the past actual consumption data is too small to carry out the above statistical processing for demand prediction or adjustment model decision, and reliable demand prediction or adjustment model decision cannot be carried out. Thus, the consumption adjustment server 100 can carry out consumption adjustment by another method in which demand prediction is omitted, until predetermined volume of actual consumption data suitable for the statistical processing is accumulated after the service is started. As this another method, a method can be employed in which the actual total consumption in the community in the immediate past (for example, yesterday) is evaluated and then a change based on the result of the evaluation is added to the request value of the consumption adjustment request for the community, the number of destinations or the incentive value in the immediate past (for example, yesterday), thus generating the request value of the consumption adjustment request for the community, the number of destinations or the incentive value in the immediate future (for example, the following day).

FIG. 12 shows the operation flow of the adjustment request generating unit 133 to carry out consumption adjustment by the above another method.

The adjustment request generating unit 133 determines whether the number of operating days from the day when the service is started is equal to or greater than a predetermined number (or whether the past actual consumption data accumulated in the actual consumption database 103 is equal to or greater than a predetermined volume) (S81), and carries out the processes shown n FIG. 11 if the result is Yes (S82). However, if the result is No, actual consumption data 271 of all the demanders in the community for the immediate past (for example, yesterday) are read out from the actual consumption database 103, and based on that, actual total consumption for each time slot for the entire community is calculated in step S83. Then, whether the actual total consumption for each time slot is excessively large, excessively small or appropriate is evaluated (S84). This evaluation can be determined, for example, based on whether the actual total consumption for each time slot departs from a predetermined range between an upper threshold value and a lower threshold value or not.

If it is appropriate as a result, zero is set as an amount of change (S85). If it is excessively large, an amount of change corresponding to the degree of excessive largeness is set, and if it is excessively small, an amount of change corresponding to the degree of excessive smallness is set (S86).

After that, actual request data 272 of the immediate past (yesterday) is read out from the adjustment request database 115, and based on that, the request value of the consumption adjustment request, the number of destinations or the incentive value is grasped and the above amount of change is added to this value. The request value of the consumption adjustment request, the number of destinations and the incentive value obtained as a result of the addition are employed as the request value of the consumption adjustment request, the number of destinations and the incentive value for the immediate future (for example, the following day) (S87).

Then, in step S88, based on the request value of the consumption adjustment request, the number of destinations and the incentive value for the immediate future (for example, the following day) which are employed, request plan data 273 and destination addresses for the immediate future (for example, the following day) are created and stored in the adjustment request database 272.

The above embodiment of the invention is an illustration example for explaining the invention and is not intended to limit the scope of the invention to the embodiment alone. The invention can also be carried out other forms than the above embodiment.

In the above embodiment, the consumption adjustment server 100 necessarily secures demanders in the community which do not receive a consumption adjustment request, and predicts future demand in the community based on the actual consumption by those demanders. However, as a modified example that is different from this, the consumption adjustment server 100 may intermittently secure times (days, time slots) when no consumption adjustment request is sent to the community at all, and predict future demand in the community based on the actual consumption in the community during those times. For example, one day or two days when no consumption adjustment request is sent may be secured every month, or the request value of the consumption adjustment request may be set to zero every day in one or two time slots that are different from other days.

In the above embodiment, the consumption adjustment server 100 preferentially selects demanders which received a consumption adjustment request a relatively small number of times or at a relatively small frequency in the past or demanders having a relatively small incentive from among the demanders in the community, as destinations of a consumption adjustment request. However, as a modified example that is different from this, the consumption adjustment server 100 may intermittently secure times (days, time slots) when no consumption adjustment request is sent to the community at all (that is, decide a first time when consumption adjustment is made and a second time when no consumption adjustment is made), and predict demand in the community during the first time when consumption adjustment is made in the future, based on the actual consumption in the community during the second time when no consumption adjustment is made in the past. For example, one day or two days when no consumption adjustment request is sent at all can be secured every month, or the request value of the consumption adjustment request can be set to zero every day in one or two time slots that are different from other days.

REFERENCE SIGNS LIST

100 consumption adjustment server
123 actual total demand calculating unit
125 total demand predicting unit
127 total power generation predicting unit
129 total adjustment value deciding unit
131 adjustment model deciding unit
133 adjustment request generating unit
143 demander EMS

The invention claimed is:

1. A system for managing energy consumption in a community including multiple demanders, the system comprising:
at least one computer having a non-transitory, physical storage medium which stores a computer program and a microprocessor which executes the computer program,
wherein the processor executes the computer program which includes commands which cause the processor to carry out the following processing A), B), C) and D):
A) predicting energy demand in the community at a specific time in the future;
B) generating a consumption adjustment request for the specific time in the future based on the predicted energy demand at the specific time in the future;
C) selecting one or more demanders which are a part of the community as one or more destination demanders for the specific time in the future; and
D) sending the energy consumption adjustment request for the specific time in the future to the one or more destination demanders for the specific time in the future,
wherein reception of the energy consumption adjustment request for the specific time in the future is configured to cause the one or more destination demanders to adjust power consumption of at least one electric power consuming apparatus thereof for the specific time in the future based on the received energy consumption adjustment request for the specific time in the future, and
wherein the command to carry out the processing A) includes commands which cause the processor to carry out the following processing AA), AB) and AC):
AA) specifying one or more demanders which are a part of the community other than the one or more destination demanders for a specific time in the past selected in a previous processing C) which was performed in the past as one or more non-destination demanders for the specific time in the past;
AB) determining actual energy consumption at the specific time in the past by the one or more non-destination demanders for the specific time in the past; and
AC) predicting the energy demand in the community at the specific time in the future based on the determined actual energy consumption by the one or more non-destination demanders for the specific time in the past.

2. The system according to claim 1, wherein the command to carry out the processing C) includes commands to carry out the following processing CA) and CB):
CA) determining a number of times or a frequency at which each of the demanders in the community is selected as one of the destination demanders in the past; and
CB) selecting the one or more destination demanders for the specific time in the future from within the community based on the determined number of times or frequency for each of the demanders.

3. The system according to claim 1, wherein the command to carry out the processing C) includes commands to carry out the following processing CC) and CD):
CC) determining actual energy consumption in the past by each of the demanders in the community; and
CD) selecting the one or more destination demanders for the specific time in the future from within the community based on the determined actual energy consumption in the past by the each of the demanders.

4. The system according to claim 1, wherein the command to carry out the processing C) includes commands to carry out the following processing CE) and CF):
CE) determining a past incentive value given to each of the demanders in the community; and
CF) selecting the one or more destination demanders for the specific time in the future from within the community based on the determined past incentive value of the each of the demanders.

5. The system according to claim 1, wherein the command to carry out the processing C) includes commands to carry out the following processing CG) and CH):
CG) determining a layout of each of the demanders in the community on an electricity distribution network; and
CI) selecting the one or more destination demanders for the specific time in the future from within the community based on the determined layout of the each of the demanders on the electricity distribution network and a prescribed electric power supply voltage of the community.

6. The system according to claim 1, wherein the command to carry out the processing AC) includes commands to carry out the following processing ACA), ACB) and ACC):
ACA) determining a ratio of a number of the demanders in the community to a number of the non-destination demanders;

ACB) expanding the actual energy consumption at the specific time in the past by the non-destination demanders using the ratio; and ACC) predicting the energy demand in the community at the specific time in the future based on the expanded value of the actual energy consumption at the specific time in the past by the non-destination demanders.

7. The system according to claim 1, wherein the command to carry out the processing B) includes commands to carry out the following processing BA), BB), BC) and BE):

BA) deciding an adjustment value of energy consumption at the specific time in the future in the community based on the predicted energy demand in the community at the specific time in the future;

BB) determining actual energy consumption by the one or more destination demanders for a predetermined time in the past selected in the processing C) in the past, at the predetermined time in the past;

BC) determining a request value of a consumption adjustment request for the predetermined time in the past generated in the processing B) in the past;

BD) determining a relation between the actual energy consumption and the request value based on the actual energy consumption determined in the processing BB) and the request value determined in the processing BC); and BE) applying the request value decided in the processing BA) to the relation determined in the processing BD) and thus deciding the request value of the consumption adjustment request for the specific time in the future.

8. The system according to claim 1, wherein the computer program further includes commands which cause the processor to carry out the following processing E), F) and G):

E) determining actual energy consumption in the community at a predetermined time in the past;

F) changing a consumption adjustment request for the predetermined time in the past that is sent in the past based on the actual energy consumption in the community at the predetermined time in the past determined in the processing F), and thus generating the consumption adjustment request for the specific time in the future; and G) selecting one of a set of the processing A) and B) and a set of the processing E) and F).

9. The system according to claim 8, wherein the command to carry out the processing G) includes commands to carry out the following processing GA) and GB):

GA) selecting the set of the processing E) and F) during a predetermined initial period after the system starts operating; and GB) selecting the set of the processing A) and B) after the initial period.

10. A method executed by at least one computer for managing energy consumption in a community including multiple demanders: the method comprising the following steps A), B), C) and D) executed by the at least one computer:

A) predicting energy demand in the community at a specific time in the future;

B) generating a consumption adjustment request for the specific time in the future based on the predicted energy demand at the specific time in the future;

C) selecting one or more demanders which are a part of the community as one or more destination demanders for the specific time in the future; and D) sending the energy consumption adjustment request for the specific time in the future to the one or more destination demanders for the specific time in the future, wherein reception of the energy consumption adjustment request for the specific time in the future is configured to cause the one or more destination demanders to adjust power consumption of at least one electric power consuming apparatus thereof for the specific time in the future based on the received energy consumption adjustment request for the specific time in the future, wherein the step A) includes the following steps AA), AB) and AC):

AA) specifying one or more demanders which are a part of the community other than the one or more destination demanders for a specific time in the past selected in a previous processing C) which was performed in the past as one or more non-destination demanders for the specific time in the past;

AB) determining actual energy consumption at the specific time in the past by the one or more non-destination demanders for the specific time in the past; and AC) predicting the energy demand in the community at the specific time in the future based on the determined actual energy consumption by the one or more non-destination demanders for the specific time in the past.

11. A non-transitory, computer readable medium which stores a computer program that, when executed by a processor, causes the processor to carry out a method for managing energy consumption in a community including multiple demanders, the computer program including commands which cause the processor to carry out the following steps A), B), C) and D) of the method comprising:

A) predicting energy demand in the community at a specific time in the future;

B) generating a consumption adjustment request for the specific time in the future based on the predicted energy demand at the specific time in the future;

C) selecting one or more demanders which are a part of the community as one or more destination demanders for the specific time in the future; and D) sending the energy consumption adjustment request for the specific time in the future to the one or more destination demanders for the specific time in the future, wherein reception of the energy consumption adjustment request for the specific time in the future is configured to cause the one or more destination demanders to adjust power consumption of at least one electric power consuming apparatus thereof for the specific time in the future based on the received energy consumption adjustment request for the specific time in the future, wherein the command to carry out the step A) includes commands which cause the processor to carry out the following steps AA), AB) and AC):

AA) specifying one or more demanders which are a part of the community other than the one or more destination demanders for a specific time in the past selected in a previous processing C) which was performed in the past as one or more non-destination demanders for the specific time in the past;

AB) determining actual energy consumption at the specific time in the past by the one or more non-destination demanders for the specific time in the past; and AC) predicting the energy demand in the community at the specific time in the future based on the determined actual energy consumption by the one or more non-destination demanders for the specific time in the past.

* * * * *